United States Patent [19]

Kohler et al.

[11] Patent Number: 4,655,674
[45] Date of Patent: Apr. 7, 1987

[54] SAFETY DEVICE FOR AN INDUSTRIAL ROBOT

[75] Inventors: Gerd Kohler; Rudolf Burger, both of Munich, Fed. Rep. of Germany

[73] Assignee: Siemens Aktiengesellschaft, Berlin and Munich, Fed. Rep. of Germany

[21] Appl. No.: 636,924

[22] Filed: Aug. 2, 1984

[30] Foreign Application Priority Data

Sep. 20, 1983 [DE] Fed. Rep. of Germany ....... 3333979

[51] Int. Cl.⁴ .............................................. B25J 19/00
[52] U.S. Cl. ...................................... 414/735; 901/29; 901/49
[58] Field of Search .................. 414/735, 730; 901/28, 901/29, 49, 45; 212/153

[56] References Cited

U.S. PATENT DOCUMENTS

| 3,885,295 | 5/1975 | Engelberger et al. | 901/45 X |
| 4,320,674 | 3/1982 | Ito et al. | 901/45 X |
| 4,540,331 | 9/1985 | Stanner et al. | 901/49 X |

FOREIGN PATENT DOCUMENTS

| 88559 | 9/1983 | European Pat. Off. | 901/29 |
| 2749603 | 9/1979 | Fed. Rep. of Germany | |
| 57-02019 | 6/1982 | Japan | 901/49 |

OTHER PUBLICATIONS

H. Wörn, "Sicherheitssysteme bei Industrierbotern", *Technische Uberwachung*, (1981) No. 5, May.

*Primary Examiner*—Robert J. Spar
*Assistant Examiner*—Donald W. Underwood

[57] ABSTRACT

A safety device connected to an industrial robot and mounting a tool characterized by an arrangement including a first and second flange for stopping the robot in response to a predetermined axially applied force to the tool and a second arrangement including the second flange and a third flange for stopping the robot in response to a shear force being applied to the tool so that a tool is protected both against shear forces and axially applied thrust during a collision in operation or during programming of the robot.

20 Claims, 1 Drawing Figure

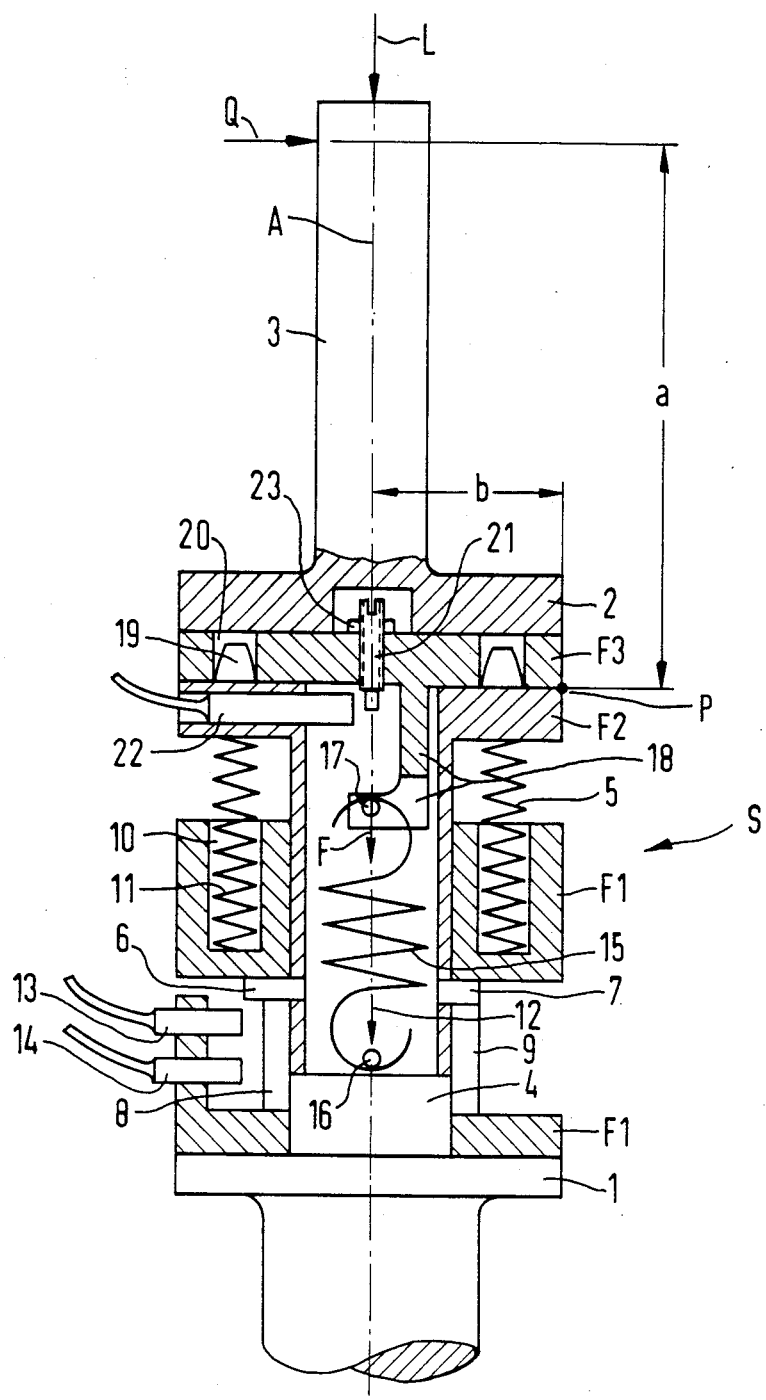

SAFETY DEVICE FOR AN INDUSTRIAL ROBOT

BACKGROUND OF THE INVENTION

The present invention is directed to a device connected to an industrial robot and mounting a tool to protect the tool from damage by collision forces.

During operation and in particular when programming industrial robots, collisions between a tool attached to the industrial robot and a peripheral surface can occur due to faults in the control or due to operating errors on the part of the programmer. Damage both to the tool such as, for example, a claw or a welding tong as well as damage to the periphery such as, for example, an apparatus can occur due to these collisions.

A safety device, which offers a certain degree of protection to a tool during a collision, is attached to an industrial robot and mounts the tool. Such a safety device is disclosed in an article by H. orn entitled "Sicherheitssysteme bei Industrierobotern", *Technische Uberwachung,* No. 5, May 1981, pages 211-215 and particularly in FIG. 4 of this article. To this end, the tool is flanged to an axis of the industrial robot by means of a packet of spring washers. This arrangement enables an overload shutdown given lateral collision. When the tool contacts an obstacle, the flanges lift off one another when a specific shearing force has been applied. The center of the flange is thereby displaced in an axial direction and this dislocation or displacement is then transmitted by a springloaded ram to a limit switch which shuts off the industrial robot when it is actuated. However, unit stresses, which act perpendicularly on the flange surfaces in the case of a collision, do not produce a tilting movement and the known safety device fails in such a type of collision.

SUMMARY OF THE INVENTION

The object of the present invention is to create a safety device for industrial robots which quickly and reliably shuts off the industrial robot given collisions involving a tool attached to the robot independent of the direction of the unit stress exerted on the tool.

To accomplish these goals, the present invention is directed to a device connected to an industrial robot and mounting a tool, said device protecting the tool from damage by collision forces. The device comprises first means for stopping the robot in response to a predetermined axially applied force to the tool and second means for stopping the robot in response to a predetermined shear force being applied to the tool, said first means including a first and second flange being displaceable to each other against a compression biasing means and first switch means for creating a stopping signal in response to axial movement between said first and second flanges and said second means comprising the second flange and a third flange being tiltable relative to each other and second switch means for creating a stop signal in response to tilting of the first and second flanges.

Given the inventive safety device, at least three flanges are provided for the connection between the industrial robot and the tool. Two of these flanges are tiltable relative to one another and actuate a switch means for shutting off the industrial robot on the basis of tilt motion given a lateral collision of the tool. Moveover, two of the flanges are displaceable in an axial direction relative to one another against the force of at least one compression spring so that an additional switch means will shut off the robot in response to the actual displacement in the case of a collision having a reaction force which acts vertically on the flange surfaces. The inventive safety device thus offers protection against lateral as well as vertical collision of the tool.

It is provided according to a preferred embodiment of the invention that the first flange comprises an axial bore in which a cylindrical continuation or extension of the second flange is disposed so as to be axially displaceable. A stable guidance of the axially displaceable second flange is achieved and as a result thereof requires a small amount of space. The cylindrical continuation of the second flange preferably comprises at least one radial projection which is guided in an axial slot in the wall of the guide bore of the first flange. The radial projection, which is expediently formed by a pin secured in the cylindrical continuation, acts as an anti-torsion means for the second flange and also limits its axial stroke. The movement, which is caused by at least one compression spring disposed between the first flange and the second flange, can thus be limited by means of the coaction of the radial projection in the axial slot.

In accordance with a further development of the invention, at least four compression springs are disposed between the first and second flanges with a uniform circumferential spacing. The compression springs are preferably held in blind holes which are provided in one of the first and second flanges. A particularly compact structure is enabled by means of employment of the plurality of compression springs and their dispositions in the blind holes.

It is also practical for the switch means for shutting off the industrial robot to be secured in the first flange and to be actuatable by means of an axial displacement of the cylindrical continuation of the second flange. The switch means can be designed as an inductive proximity switch. In this case, the switch means can then be actuated in a particularly simple fashion by the radial projection of the cylindrical continuation of the second flange.

The space requirement for the overall safety device can also be further reduced when the cylindrical continuation of the second flange is designed as a hollow cylinder in which a tension spring which connects the cylindrical continuation of the second flange to a tiltable third flange is disposed. The employment of the tension spring for generating the retaining force between the second and tiltable third flange also has the advantage that the tool automatically springs back into its initial position as soon as it is displaced out of the collision position. If this retaining force were generated by magnets or vacuum chambers, then the tool would hang limply on the industrial robot after a lateral collision and after the tilting of the third flange.

The tension spring is preferably attached to the third flange by a clamp clip of the third flange which projects into the hollow cylinder of the extension of the second flange. It is also particularly beneficial for the bias path of the tension spring to be high in comparison to its additional extension given a tilting motion of the third flange. Due to this, the reaction power exerted on a tool given a lateral collision of the tool remains nearly constant during the tilting event.

In another feature of the device, at least two positioning pins are secured in the second flange and have conically tapering heads which are engaged in bores in the tiltable third flange. Without interfering with possible tilting motion, an unequivocal position of the second flange and third flange relative to one another is produced by these pins.

It is also practical for the switch means for shutting off the industrial robot to be secured in the second flange and to be actuatable by means of an actuating pin that is centrally secured in the tiltable third flange. The actuating pin can thereby be secured in the tiltable third flange so as to be adjustable in an axial direction. Just like the other switch means, the switch means can also be designed as inductive proximity switch.

To mount the device it is expedient that the first flange be directly connected to the flange of the industrial robot particularly for re-equipping industrial robots that do not have the safety device. Accordingly, the tiltable third flange can be directly connected to a flange of the tool and act to mount it on the robot. It is thus possible to incorporate the entire, compactly designed safety device between the flanges of the industrial robot and tool.

BRIEF DESCRIPTION OF THE DRAWINGS

The Figure is a longitudinal cross-sectional portion in elevation for purposes of illustration of the device in accordance with the present invention.

DESCRIPTION OF THE PREFERRED EMBODIMENTS

The principles of the present invention are particularly useful when incorporated in a safety device generally indicated at S in the Figure. As illustrated, the device S is inserted between the flange 1 of an industrial robot and flange 2 of a tool 3 which may be a claw. The safety device S thus comprises a first flange or member F1, which is secured on the flange 1 of the industrial robot, a second flange or member F2, which is axially displaceable relative to the first flange F1 and a third flange or member F3, which is tiltable relative to the second flange F2 and is secured to the flange 2 of the tool 3.

The first flange F1 comprises an axial guide bore 4 in which a cylindrical continuation 5 of the second flange F2 is received so as to be axially displaceable. As illustrated, the flange F1 has a pair of slots 8 and 9, which receive two guide pins 6 and 7 of the continuation or extension 5 of the flange F2. These pins and slots act to torsionally fix the second flange relative to the first flange and also to limit the axial stroke therebetween. The first flange F1 has four blind holes 10 which receive compression springs 11 which project out of the blind holes 10 and engage the second flange F2 and bias it away from the first flange F1. Thus, the four compression springs 11 form compression biasing means which hold or maintain the second flange F2 at a given position from the first flange F1 which position is determined by the pins 6 and 7 which are received in the slots 8 and 9. An axial stroke motion of the second flange F2 executed against the force of the compression springs 11 in the direction of arrow 12 will cause the movement of the pin 6 in the slot 8 and will be sensed by inductive proximity switches 13 and 14, which are rigidly mounted in the first flange F1.

As illustrated, the cylindrical continuation 5 is preferably hollow and receives a tension spring 15 which has one end hooked on a cross-pin or member 16 and the other end on a cross-member or pin 17 which is part of a clamp clip or projection 18 of the third flange F3 which clamp clip projects into the cylindrical continuation 5. Due to the force of the tension spring 15, the second flange F2 and the tiltable third flange are pulled toward one another. Because of four positioning pins 19, which are firmly secured to the second flange and have conical tapered ends which are received in fixed bores 20 of the third flange F3, an unequivocal position of the second flange F2 and the third flange F3 relative to one another is produced. While the positioning pins 19 are illustrated as being aligned with the springs 11, they are preferably offset so that they may be fastened on the flange without interrupting the seating surface for the compression springs 11. A tilting motion of the tiltable third flange F3 can be detected by means of a corresponding axial motion of an actuating pin 21 which is centrally disposed in the axis of the third flange 3 and coacts with an inductive proximity switch 22 which is rigidly disposed in the second flange F2. The actuating pin 21 is designed as a set screw and therefore can be adjustable in an axial direction and is secured in a desired position by means of a counter-nut or lock nut 23.

In case of a collision of the tool 3 with the periphery of the industrial robot or any other object, a reactive force is exerted on the tool 3 and has a reactive component which is acting perpendicular to an axis A of the overall device as a shearing force or lateral force Q and also a force acting in the axial direction as a thrust or axial force L. When the shearing force Q is applied to the tool 3 at, for example, the distance a from the parting plane between the second flange F2 and the third flange F3, then a moment $M1=Q.a$ will be created with respect to the transition point P. This moment is opposed by a moment $M2=F.b$ wherein F denotes the power of the biasing spring 15 and b denotes the distance between the axis A and the transition point P. When the moment M1 becomes greater than the moment M2, then the third flange F3 will tilt away or pivot from the second flange around the transition or pivot point P. The inductive proximity switch 22 serving as a switch means for shutting off the industrial robot is then actuated by means of the tilting motion, for example, the signal change of the inductive proximity switch 22 will trigger an "Emergency Stop" of the robot when the third flange F3 is tilted on the flange F2.

When the thrust L is applied on the tool 3, then the second flange F2 will be shifted in axial direction insofar as the thrust L is greater than the power of the four compression springs 11 acting in the opposite direction. The axial excursion of the second flange F2 is thus monitored by the inductive proximity switches 13 and 14. The inductive proximity switch 13 thereby assumes an interrogation function wherein the inductive proximity switch 14 serves as an additional switch means for shutting off the industrial robot. For example, given a corresponding excursion of the second flange F2, the signal change of the inductive proximity 14 will trigger an "Emergency Stop" of the industrial robot.

Although various minor modifications may be suggested by those versed in the art, it should be understood that we wish to embody within the scope of the patent granted hereon, all such modifications as reasonably and properly come within the scope of our contribution to the art.

We claim:

1. A device connected between an industrial robot arm and a tool carried thereby, said device protecting the tool from damage by collision forces, said device comprising first means for stopping the robot in response to a predetermined axially applied force to the tool and second means separate from the first means for stopping the robot in response to a predetermined shear force being applied to the tool, said first means including a compression biasing means, a first and second flange being displaceable relative to each other against the compression biasing means, and first switch means for creating a stopping signal in response to the axial movement between said first and second flanges and said second means comprising the second flange, a third flange and connecting means extending therebetween, said connecting means resiliently and elastically holding the second and third flanges together and enabling tilting movement therebetween and said second means including second switch means for creating a stopping signal in response to tilting movement between the second and third flanges.

2. A device according to claim 1, wherein the first flange has an axial guide bore and the second flange has a cylindrical continuation received in the axial guide bore.

3. A device according to claim 2, wherein the cylindrical continuation has at least one radial projection which is received in an axial slot in a wall of the guide bore of the first flange.

4. A device according to claim 3, wherein the radial projection is formed by a pin secured in the cylindrical continuation.

5. A device according to claim 3, wherein the distance between the first and second flanges caused by the compression biasing means is limited by the projection in the axial slot.

6. A device according to claim 2, wherein the compression biasing means comprises at least four compression springs positioned between the first flange and the second flange with a uniform circumferential spacing therebetween.

7. A device according to claim 6, wherein one of the first and second flanges is provided with four blind holes for the four compression springs with each blind hole receiving a portion of the compression spring associated therewith.

8. A device according to claim 2, wherein the first switch means is secured on the first flange and is actuatable by means of axial displacement of the cylindrical continuation of the second flange in the axial bore.

9. A device according to claim 8, wherein the first switch means is an inductive proximity switch.

10. A device according to claim 9, wherein the cylindrical continuation has at least one radial projection received in an axial slot in a wall of the axial guide bore of the first flange, said inductive proximity switch being actuated by movement of the radial projection.

11. A device connected to an industrial robot and mounting a tool thereon, said device protecting the tool from damage by collision forces and comprising first means for stopping the robot in response to a predetermined axially applied force to the tool and the second means for stopping the robot in reponse to a predetermined shear force being applied to the tool, said first means including a first flange having an axial guide bore, a second flange having a hollow cylindrical continuation being received in the axial guide bore, and a compression biasing means, said first and second flanges being displaceable relative to each other against the compression biasing means, said first means being first switch means for creating a stopping signal in response to the axial movement between said first and second flanges, and said second means comprising the second flange and a third flange being tiltable relative to each other, a tension spring being received in the hollow cylindrical continuation and connecting the second flange to the third flange, and a second switch means for creating a stopping signal in response to tilting movement between the second and third flanges.

12. A device according to claim 11, wherein the tension spring is attached to a clamp clip of the third flange, said clamp clip projecting into the hollow cylinder.

13. A device according to claim 11, wherein the bias path of the tension spring is high in comparison to additional extension occurring during a tilting motion of the third flange on the second flange.

14. A device according to claim 11, wherein the second flange includes at least two positioning pins having conically tapered heads and the third flange has fixed bores for receiving said heads.

15. A device according to claim 11, wherein the second switch means is secured in the second flange and is actuatable by means of an actuating pin which is axially secured on the third flange.

16. A device according to claim 15, wherein the actuating pin is adjustable in its axial length.

17. A device according to claim 15, wherein the second switch means is an inductive proximity switch.

18. A device according to claim 1, wherein the first flange is directly connected to a flange of the industrial robot.

19. A device according to claim 1, wherein the third flange is directly connected to a flange of the tool.

20. A device according to claim 1, wherein the connecting means for holding includes a tension spring.

* * * * *